Figure 1:
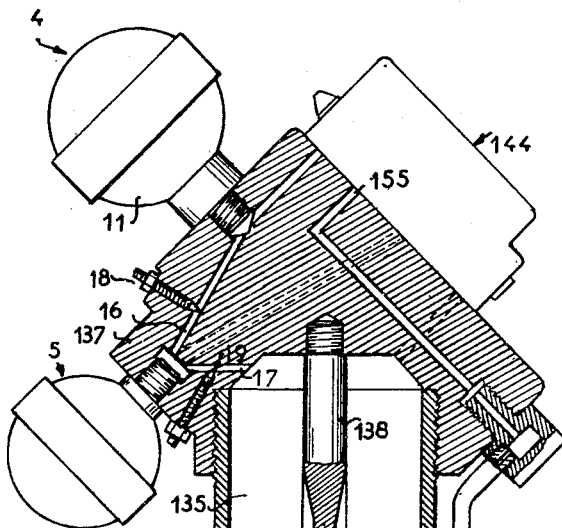

United States Patent Office 3,149,831
Patented Sept. 22, 1964

3,149,831
DAMPED HYDRAULIC SUSPENSION
Pierre Ernest Mercier, Piscop, Seine et Oise, France, assignor to SFERMA, Societe Francaise d'Entretien et de Reparation de Materiel Aeronautique, Piscop, Seine, France, a company of France
Filed June 6, 1963, Ser. No. 286,007
Claims priority, application France June 12, 1962
12 Claims. (Cl. 267—64)

The present invention relates to hydraulic suspension apparatus provided with a damping device, of the type comprising a mechanically deformable compartment one element of which is connected to the chassis of the vehicle and the other element is connected to the corresponding wheel for the vertical movements of the said wheel, and an elastically deformable element connected to the mechanically deformable compartment by means of a liquid agent which passes through a damping device.

The object of the invention is to provide a hydraulic suspension apparatus with damping device of the type specified, the operation of which is not liable to produce jolts or impacts and which does not run any risk of ceasing to operate satisfactorily under the influence of, more particularly, variations in the vicsosity of the damping liquid resulting from variations in ambient temperature.

The object in view, in order to perfect such a hydraulic suspension apparatus with damping device, aims at using only pressure variations for controlling the flow of liquid in the damping device.

For this purpose, the hydraulic suspension apparatus with damping device according to the invention comprises three chambers comprising mobile walls connected mechanically to one another by a mobile unit and designed and arranged in such a manner that the volumes of the said chambers cannot vary except simultaneously, the volumes of the second and third chambers varying in the opposite sense to variation of the volume of the first chamber, the first chamber being connected to the deformable compartment, the second chamber or intermediate chamber being connected preferably by way of a calibrated constriction to an enclosure wherein prevails an intermediate reference pressure dependent on the pressures which prevail during the stationary state in the mechanically deformable compartment and in the elastically deformable element respectively, and the third chamber being connected to the deformable elastic element, the first and third chambers being connected on the one hand under the effect of a divergent movement of the suspension in accordance with the direction of this movement by one or other of two relatively large-section and unidirectional-flow circuits one of which permits the passage of the said liquid only from the first chamber to the third chamber and the other from the third to the first chamber, the outflow of liquid from the first chamber and the outflow of liquid from the third chamber being controlled by the mobile unit, in such a manner that they are substantially closed in the stationary state i.e. in the condition of rest, and on the other hand under the effect of a convergent movement of the suspension by a relatively narrow-section circuit having two directions of flow, which is controlled also by the mobile unit, in such a manner that it is opened only when the said unit is only a small distance from its position of rest.

Owing to this particular structure, each time that the mobile member of the mechanically deformable system is the seat of a divergent movement, that is to say in the direction removing it from its position of rest, its movement is substantially not braked by the damping device, whose liquid passes easily from one end chamber into the other through the corresponding unidirectional-flow circuit, whilst on the contrary the return of the mobile member towards its position of rest, that is to say by a convergent movement, is effected under the action of a reduced force adapted to increase the apparent flexibility of the suspension, all these characteristics being controlled solely by the pressure conditions which prevail in the various chambers of the damping device, so that the final result is independent of the speed of the liquid and its viscosity and consequently independent of the ambient temperature.

In one form of embodiment, the damping device also comprises a supplementary connecting circuit between the first and third chambers with a low-inertia device preferably of the seatless elastic disc type with bilateral deflection, adapted to permit free passage of the liquid in both direction, from a pre-determined value of the difference in the pressures prevailing on either side of this device, with the object of damping the short-period and/or steep-front oscillations connected more particularly with vibrations of the wheels and features in the road surface, such as for example landing impacts where an aircraft is concerned.

Figure 2:
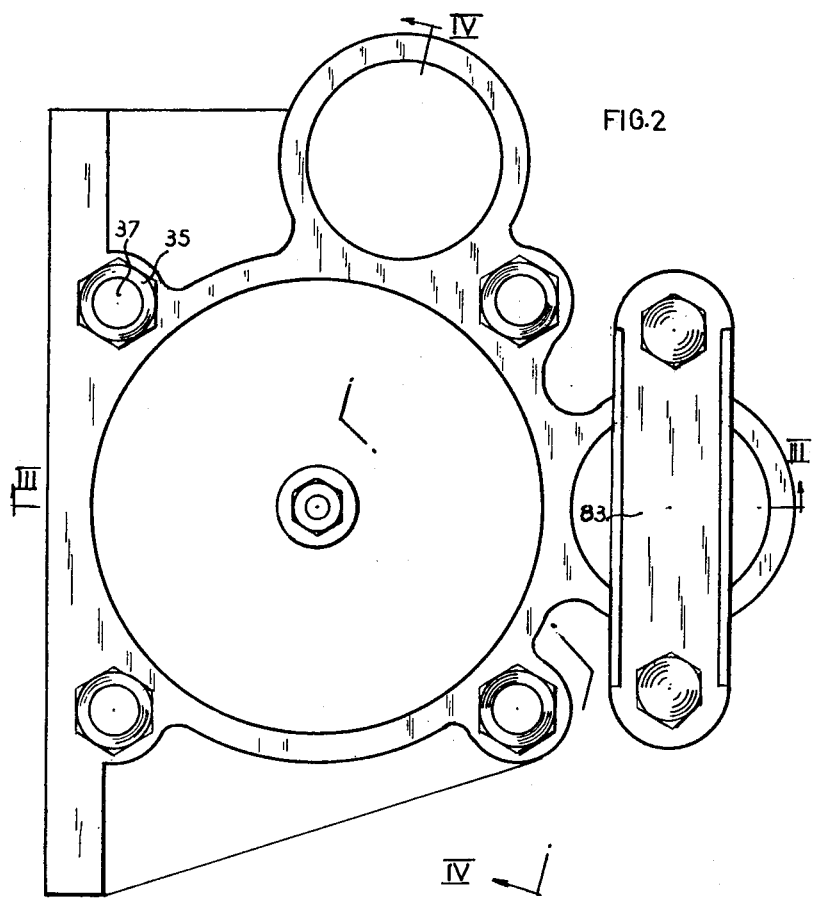
Figure 3:
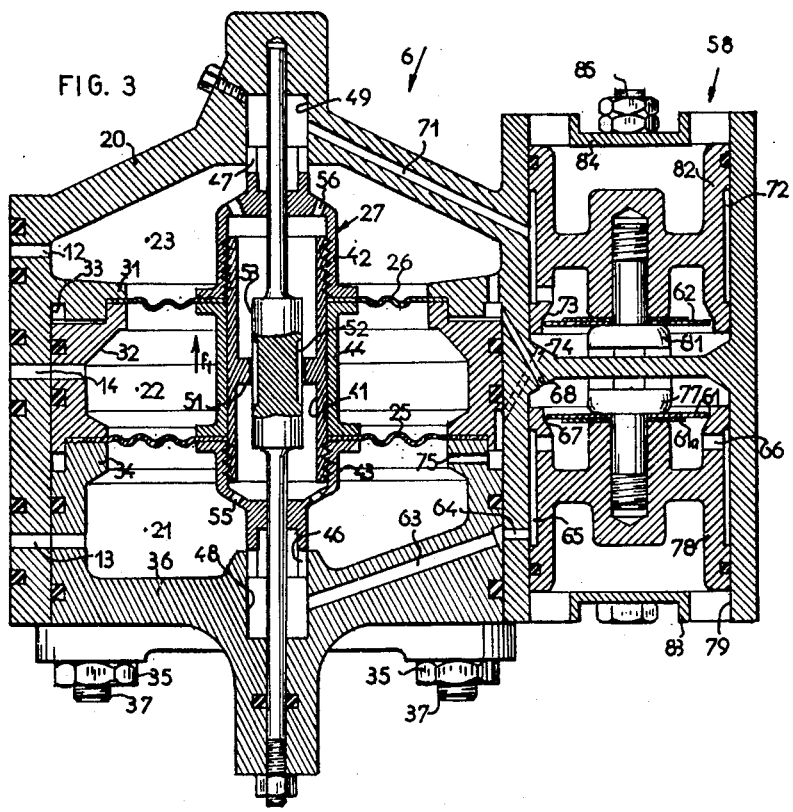
Figure 4:
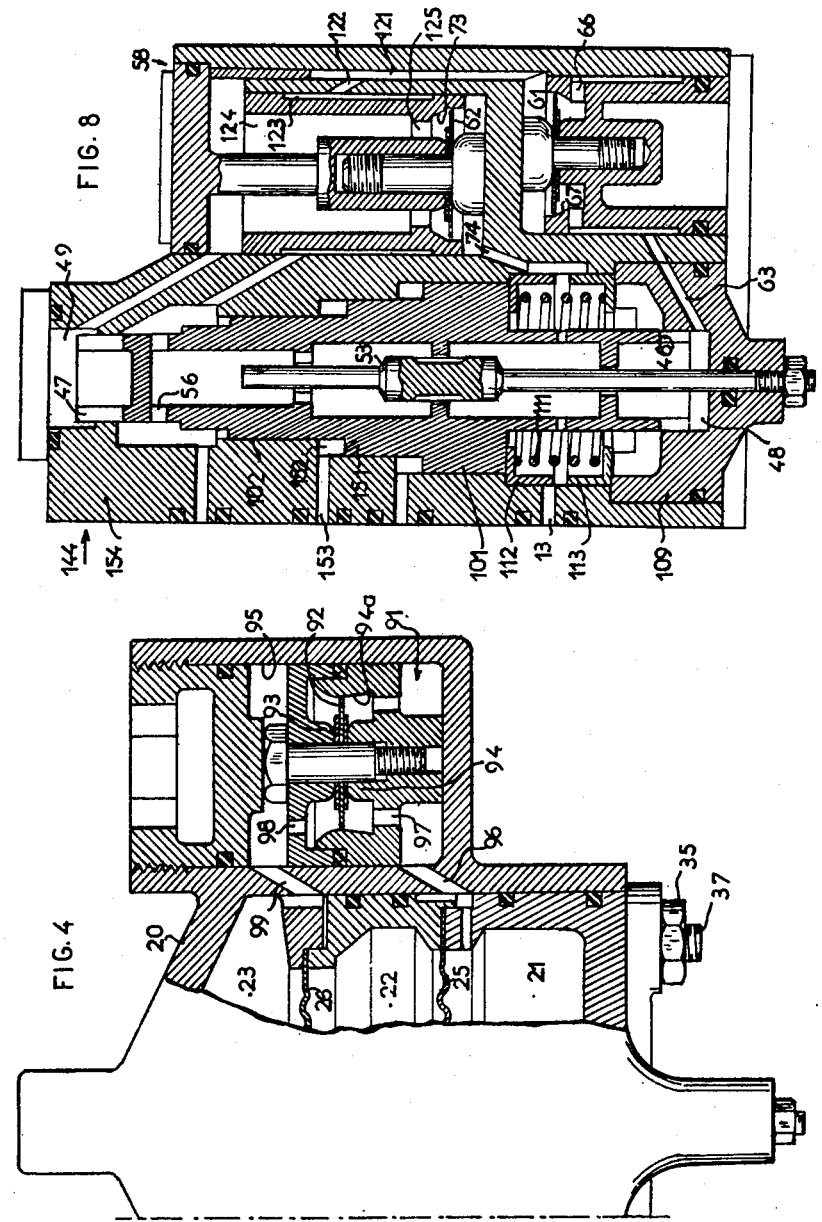
Figure 5:
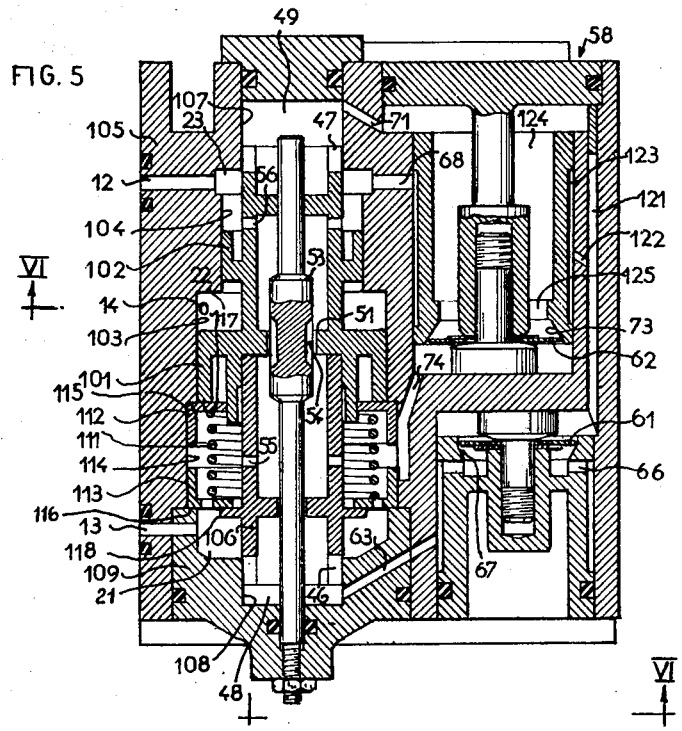
Figure 6:
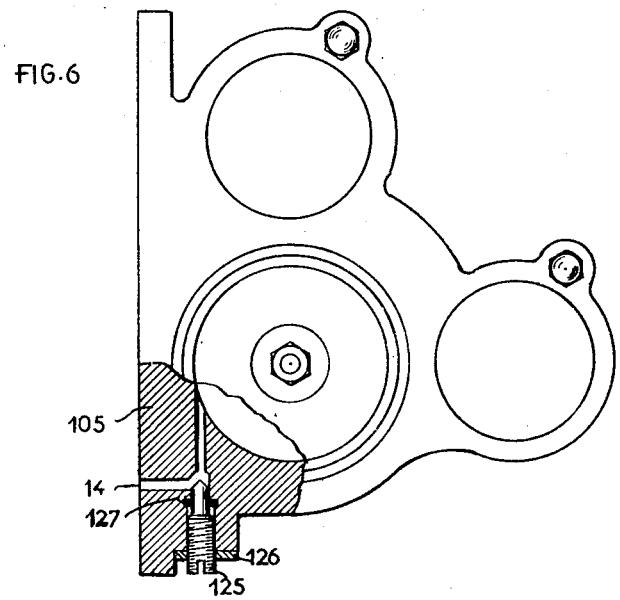

The invention is illustrated by way of example in the accompanying drawings in which:

FIGURE 1 is a general sectional view of a hydraulic suspension apparatus with damping device according to the invention, FIGURE 2 is an external view on a larger scale of the damping device viewed in the direction of the arrow II of FIGURE 1, FIGURE 3 is a sectional view of the damping device taken on the line III—III of FIGURE 2, FIGURE 4 is a sectional view on the broken line IV—IV of FIGURE 2, FIGURE 5 shows a constructional variant of the damping device according to FIGURE 3, FIGURE 6 is a partial sectional view taken on the line VI—VI of FIGURE 5, FIGURE 7 is a sectional view of another form of embodiment of a hydraulic suspension apparatus with damping device, wherein the suspension member comprises two mechanically and inversely deformable spaces instead of only one as in FIGURE 1 and FIGURE 8 shows on a larger scale and in section the damping device of FIGURE 7.

The damped suspension apparatus shown in FIGURES 1 and 3 which can be used more particularly for the control of the movements of a motor vehicle wheel relatively to the chassis, comprises a piston 1 connected mechanically to the wheel in question in the vertical displacements of the said wheel, the said piston being mobile in a cylinder 2 connected to the chassis. The cylinder head is constituted by a block 3 on which are mounted three devices designated respectively as 4, 5 and 6.

The device 4 comprises an elastically deformable member intended to effect suspension, the device 5 is intended to provide a reference pressure which will be discussed further hereinafter, and the device 6 is a hydraulic device controlling the damping of the suspension.

The suspension device 4 is constituted for example by a hollow metal sphere 11 in which is imprisoned a mass of gas held under pressure and connected to the piston 1 by a mass of liquid distributed in the remainder of the sphere 4, the damping device 6 and the chamber 7 of the cylinder 2, communication between the sphere 4 and the damping device 6 being provided through a duct 12 and communication between the said damping device and the chamber 7 of the cylinder through another duct 13, these two ducts being formed in the block 3.

The reference pressure device 5 is constituted in this example also by a hollow metal sphere 15 in which another mass of gas is imprisoned, the remainder of the sphere being filled with liquid communicating with the liquid of the suspension sphere 11 through a duct 16 and with the liquid of the cylinder 7 through another duct 17. The two ducts 16 and 17 are provided respectively with constrictions 18, 19 which are preferably of regulatable cross-section.

In the condition of rest, the pressure P1 in the chamber 7 of the cylinder, the reference pressure P2 in the device 5, and the pressure P3 in the suspension device are of course equal. Furthermore, the pressure P2 defines a mean reference pressure which is a function of the mean values of the pressures P1 and P3 and tends to vary with one or other in accordance as the cross-section of the corresponding constriction which puts it in communication with these pressures is larger.

The damping device 6 (see more particularly FIGURE 3) comprises a body 20 providing a cylinder divided into three superposed chambers 21, 22, 23 respectively subjected to the pressures P1, P2, and P3, by means of the ducts 13, 14 and 12, the said compartments being separated by two deformable diaphragms 25, 26 whose outer edges are fast with the body 20 and whose inner edges are fast with a cylindrical slide valve which is given the general reference numeral 27.

The outer edge of the diaphragm 26 is gripped between an annular internal shoulder 31 of the body 20 and a ring 32 lodged in a bore 33 in the said body, whilst the external edge of the diaphragm 25 is gripped between the said ring 32 and another ring 34, the assembly being held in position by any suitable conventional means such as, for example, nuts 35 which bear against the outer face of a bearing plate 36 which is integral with the ring 34 and which are mounted on two screwthreaded rods 37 fast with the body 20.

The slide valve assembly 27 is constituted in this example by an internal tubular part 41 on the ends of which are fitted, for example by screwing, two end parts 42, 43 between which is interposed an external tubular part 44, the internal edge of the diaphragm 25 being gripped between the two parts 43 and 44 whilst the internal edge of the diaphragm 26 is gripped between the two parts 44 and 42.

The slide valve assembly 27 comprises external active elements and internal active elements. The external active elements are constituted by slots 46 and slots 47 formed in the ends of two hubs which respectively form terminations of the parts 43 and 42 and which slide in cylindrical bores of corresponding diameter 48, 49 in the body 20 so as to control the communication between the chamber 21 and the bore 48 on the one hand and the chamber 23 and the bore 49 on the other hand.

The internal control elements of the slide valve 27 are constituted by an annular rib 51 projecting from the internal cylindrical surface of the internal tubular part 41, this rib co-operating with longitudinal grooves 52 formed over a certain length of the said part on the cylindrical surface of a rod 53 held fixed in the body 20, axially of the slide valve 27. The rib 51 is adapted to control communication between the two end chambers 21 and 23 through holes 55 in the end part 43 of the slide valve and holes 56 in the other end part 42.

The effective surface of the diaphragm 25 is larger than that of the diaphragm 26 but, in the condition of rest, that is to say in any position of equilibrium of the damped suspension apparatus, since the pressures P1, P2 and P3 are equal, the diaphragms maintain a generally plane shape under the effect of their own elasticity, and the rib 51 is situated substantially in the middle of the length of the grooves 52, so that communication is established directly between the end chambers 21 and 23 and furthermore the end slots 46 and 47 are almost completely engaged in the corresponding bores 48 and 49 in a symemtrical fashion.

Between the chambers 21 and 23 where the pressures P1 and P3 prevail respectively there are established two distinct kinds of communication namely: unidirectional communication directed from 21 towards 23, and unidirectional communication from 23 towards 21 in response to moderate but relatively low-frequency pressure differences resulting from divergent movements of the piston 1 i.e. from the position of rest, such as oscillatory movements of the chassis, and free communication in both directions between these two chambers in response to pressure differences between P1 and P3 which are much greater and of relatively rapid frequency resulting also from divergent movement of the piston, such as oscillatory movements of the wheels.

Communications between the chambers 21 and 23 in response to moderate and relatively low-frequency pressure differences are ensured in combination with movements of the slide valve 27 by a seatless-valve control system designated with the general reference numeral 58, whose essential elements are constituted by two elastic diaphragms 61, 62 which respectively control the passage of the liquid from the chamber 21 into the chamber 23 through the slots 46 of the slide valve, and the bore 48, a duct 63 in the bearing plate 36, a duct 64 in the body 20, an annular space 65, holes 66, the space between the edge of the diaphragm 61 and a surface of revolution 67 acting as a seat, and a duct 68 in the body 20.

In a similar and symmetrical fashion, the diaphragm 62 controls the passage of the liquid from the chamber 23 to the chamber 21 through the end slots 47 of the slide valve, the bore 49, a duct 71 of the body 20, an annular space 72, the gap between the external edge of the diaphragm 62 and a suitable surface of revolution 73, a duct 74 of the body 20 and a duct 75 which debouches into the chamber 21.

The internal edge of the diaphragm 61 is held rigidly with respect to the body 20. For ease in assembly, the central portion of the said diaphragm is gripped between a part 77 and a part 78 which is mounted in a suitable bore 79 of the body.

In a similar manner, the diaphragm 62 is gripped by its internal edge between a part 81 and a part 82 mounted also in the said bore.

The two parts 78 and 82 are immobilised in the body by means of two stirrups 83, 84 gripped by bolts such as 85.

The circular diaphragm 61 is reinforced at its face connected to the chamber 21 by a disc 61a of smaller diameter. The features of this assembly of two discs 61, 61a and the curvature of the part of revolution 67 which acts as a seat without bearing surface are such that when the diaphragm 61 is subjected to a stronger pressure from the chamber 21 than from the chamber 23, the edge of the disc moves away markedly from the surface of revolution and leaves a considerable cross-section of passage for the liquid, which can flow from the chamber 21 to the chamber 23. On the contrary, when the pressure P3 in the chamber 23 is greater than the pressure P1 in the chamber 21, the deformations of the diaphragm are such that its edge follows substantially the surface of revolution 67 and allows substantially no passage of liquid, or allows the passage of only a negligible quantity.

In a symmetrical manner, the diaphragm 62 permits the liquid to pass freely from the chamber 23 into the chamber 21 when the pressure P3 is greater than the pressure P1 and, conversely, it allows substantially no passage of liquid from the chamber 21 into the chamber 23 when the pressure P1 is greater than the pressure P3.

The diaphragms 61 and 62 are calibrated so as to allow the passage of the liquid in the appropriate direction in response to relatively small pressure differences.

Communication between the chambers 21 and 23 in response to considerable pressure variations under relatively high frequencies is ensured by another control device given the general reference numeral 91, which is connected in parallel with the chambers 21 and 23, with the system 58 which has just been described for relatively low frequencies. The control system 91 is in this example also in the form of an elastic disc 92 gripped at its internal edge between two parts 93, 94 locked in a bore 95 in the body 20. The free edge of the disc 92 is moved, by elastic deformation of the said disc, relatively to a surface of revolution 94a which in this example belongs to the part 94 and which has such a configuration that as soon as the diaphragm 92 is deformed in one direction or in the other, it allows a wide passage to the liquid which exerts this pressure on any one of its two faces. However, such passage takes place only from a relatively considerable differential pressure value on the two faces of the diaphragm 92 onwards. Communication between the end chambers 21 and 23 is, therefore, ensured equally well in both directions by the following passages: chamber 21, duct 96, hole 97 in the part 94, gap controlled by the diaphragm 92, hole 98 in the part 93 and duct 99 in the body 20.

The apparatus operates in the following manner:

Starting from the position shown in the drawings, which is a position of rest or a position of equilibrium of the suspension, and assuming that the wheel encounters an obstacle for example, the piston 1 is driven into the cylinder 2 as a result (FIGURE 1) so that the chamber 7 of the said cylinder diminishes in volume and the pressure P1 increases and tends to rise relatively to the pressures P2 and P3 which prevail in the chambers 22 and 23 (FIGURE 3) respectively. The diaphragm 25 whose effective surface is greater than that of the diaphragm 26, tends to move in the direction of the arrow $f1$, carrying the slide valve 27 with it. The slots 46 are unmasked whilst the slots 47 are completely closed. Liquid coming from the cylinder 7 enters the chamber 21 through the duct 13 and then passes through the slots 46, bore 48, duct 63, duct 64, holes 66, the gap between the external edge of the diaphragm 61 (which it repels) and the surface of revolution 67, the duct 68, and finally ends at the chamber 23, whence it can flow through the duct 12, to the suspension device 4. The pressures P1 and P3 reach a common value which is greater than P2 and the volume of the intermediate chamber 22 has diminished.

The lifting movement of the wheel, therefore, has not been hindered since the liquid has passed through a circuit which has slight hydraulic resistance, from the cylinder 7 to the suspension device 4.

Once the obstacle has been surmounted, the piston 1 tends to return to its initial position, and the pressure P1 which was greater than P3 becomes equal to and then smaller than the latter. When the piston begins its return movement, the pressure P1 diminishes relatively to P3, whilst remaining greater than P2, the mean reference pressure, since the return movement pre-supposes a restoring force greater than the force which exists at equilibrium and which corresponds to P2. The diaphragms 25, 26 tend to resume their position of equilibrium whilst for the moment remaining deformed in the direction of the arrow $f1$, the difference between the pressures P1 and P2 being connected with the relative magnitudes of the effective surfaces of these two diaphragms which give precisely at the annular groove 51 the desired position relatively to the grooves 52 of the slide valve or central distributor, to permit a controlled flow of the liquid from the chamber 23 to the chamber 21 through the holes 56 and 55 of the slide valve, that is to say a slow flow of the liquid of the suspension device 4 towards the cylinder 2. In other words, the damping device increases the apparent flexibility of the suspension by reducing the restoring force on the piston in its convergent movement, that is to say its return movement to its position of rest.

When the piston 1 is moved away from its position of rest (divergent movement), the pressure P1 and the pressure P3 vary together, for example in the increasing sense, and diverge from the pressure P2, and $P1=P3>P2$.

When the piston begins its return movement, the pressure P1 diminishes before the pressure P3. At the moment of equilibrium the following equation obtains:

$$(P1-P2)S1 = (P3-P2)S2$$

wherein S1 is the effective surface of the large diaphram 25 and S2 is the effective surface of the small diaphragm 26.

Hence $$\frac{P1-P2}{P3-P2} = \frac{S2}{S1} = k$$

This ratio $k$ represents the co-efficient of reduction of the restoring force of the suspension piston, in the convergent movement, relatively to the value $Fo$ which the restoring force would have if there were no damping. In other words, the effective restoring force F is equal to $F=k \times Fo$ with $k<1$.

Similarly, if when the wheel is passing over a depression in the road, the piston 1 instead of moving towards the block 3 moves in the opposite direction from its position of equilibrium, the pressure P1 would tend to decrease, the slide valve 27 would move in the direction opposite to that of the arrow $f1$ (FIGURE 3), the slots 47 would open wide whereas the slots 46 are completely closed, and the liquid would flow out substantially freely from the chamber 23 towards the chamber 21 by the following path: slots 47, bore 49, duct 71, gap between diaphragm 62 and the surface of revolution 73, duct 74 and duct 75, so that liquid from the suspension system 4 would pass freely into the cylinder 7. In this case, the volume of the intermediate chamber 22 would have increased.

When the piston tends to resume its initial position the throttling of the liquid between the chamber 7 of the cylinder and the suspension device 4 would be further ensured by the constriction formed by the annular rib 51 in co-operation with the central distributor 52, so that the return movement is slowed down in the same way as in the case where the wheel is lifted in passing over an obstacle.

This operational phase which has its just been described corresponds to the damping of a slow oscillation of the suspended mass of the vehicle.

In contrast to this slow oscillation, if one considers a rapid oscillation of the wheel and of the non-suspended mass associated with the said wheel under the effect of a very considerable force such as a landing impact for example in the case of aircraft, the liquid passes directly from an end chamber 21 or 23 to the opposite chamber by the action of the diaphragm 92 (FIGURE 4) which controls the passage of the liquid in both directions. For a rapid oscillation of this kind, the diaphragm 92 is capable of responding without inertia in a substantially instantaneous manner, whereas the mobile unit 27 carried by the two diaphragms 25, 26 has of course an appreciable inertia and would not be substantially displaced in response to such rapid variations in pressure. Conversely, for moderate forces, the diaphragm 92 will not be sufficiently deformed to allow the passage of the liquid, so that there is no instantaneous transfer of the liquid from one chamber to the other at the return of the piston to its initial position, since this return is conditioned by the value of the constriction of the central distributor, which is subjected to the action of the differential-pressure diaphragms.

In all cases, the conditions of flow of the liquid are controlled solely in response to relative variations in the pressures which prevail in the various chambers, so that they are not influenced by variations in the viscosity of the liquid. The apparatus ensures efficient damping whatever the amplitude of the movements to be damped.

It will be apparent that without the presence of the system which comprises the bi-directional control diaphragm 92, at rapid movements of the piston 1 caused for example by oscillations of the wheel there would be shocks and sudden impacts in the diaphragm device, which is inadmissible.

In FIGURE 5 there is shown a constructional variant which differs essentially from the structure of FIGURE 3 in that the deformable diaphragms are replaced by co-axial sliding pistons.

Two co-axial pistons 101, 102, which are fast with one another, slide in two corresponding bores 103, 104 of the body 105, the piston 101 having a larger diameter than that of the piston 102.

The two pistons 101 and 102, are fast with a tubular part 106 (consisting of two components for reasons of handiness in construction) which slides by means of its two ends in a bore 107 in the body 105 and in a bore 108 in a bearing plate 109 respectively. This tubular part 106 fulfils the function of the slide valve in the form of embodiment shown in FIGURE 1, and the same slots 46, 47 are shown at its two ends.

Therefore, the two pistons 101 and 102 form in the body 105 the three chambers 21, 22, 23, which are connected respectively by ducts 13, 14 and 12 to the cylinder 7, to the mean reference pressure device 5 and to the suspension device 4.

The same reference numerals have been used to designate the central distributor 53 with its grooves 54 and the annular partition 51 fast with the mobile unit of the two pistons.

This mobile unit is held in its position of rest by an elastic preloading system comprising a helical spring 111 whose two ends are suported respectively in the ends of two cups 112, 113 which slide in a bore 114 co-axial with the bores of the sliding pistons. The positions of maximum spacing of the two cups are determined by abutments formed by two shoulders 115, 116 of the body, whilst they can be moved towards one another by one or other of two shoulders 117, 118 belonging to the sliding mobile unit. This elastic preloading system for the return of the pistons to their position of rest acts instead of the elasticity of the diaphragms of the form of embodiment shown in FIGURE 3.

The seatless-valve control device designated with the general reference numeral 58 operates in a similar manner to that used in the form of embodiment of FIGURE 1, except that the structure is slightly different. The path of the liquid from the chamber 21 to the chamber 23 through this valve system comprises: the slots 46 of the slide valve, the bore 48, the duct 63, the holes 66, the gap between the external edge of the disc 61 and the corresponding surface of revolution 67, the duct 121, the hole 122, the annular space 123, the hole 68 which itself debouches into the chamber 23.

In the opposite direction, the path of the liquid from the chamber 23 follows the slots 47 of the slide valve, the bore 49, the duct 71, the annular gap 124, the holes 125, the gap between the external edge of the elastic disc 62 and the corresponding surface of revolution 73, and the duct 74 which debouches into the chamber 21.

Communication between the intermediate chamber 22 and the reference pressure device 5 by the duct 14 comprises a calibrated constriction of any suitable conventional type, constituted in the example illustrated by a pointed screw 125 (FIGURE 6) mounted in the body and locked by a nut 126, sealing-tightness being provided by a ring 127. The presence of this calibrated constriction is particularly useful in the present form of embodiment using sliding pistons in order to avoid shocks and impacts, but it could also be used in other embodiments, more particularly that using diaphragms which is shown in FIGURE 3. Abutment at the end points of the travel of the mobile unit is effected by the cups 112–113, which may advantageously be made of a non-metallic material.

The operation of the apparatus shown in FIGURES 5 and 6 is exactly the same as that of FIGURE 3, flows of liquid occurring in dependence on pressure differences in accordance with the same process, the only difference between these two apparatus residing in their construction i.e. the replacement of the deformable diaphragms with different effective surfaces by co-axial pistons of different diameters.

In FIGURE 7 there is shown a variant used in a variable-flexibility suspension system comprising a certain number of supplementary elements relatively to that of the form of embodiment shown in FIGURE 1.

The piston 133 mobile in the cylinder 134 is a differential piston which in the said cylinder bounds two chambers 135, 136. The block 137 which closes one end of the cylinder carries a rod 138 which extends through the piston 133 and can enter an axial cavity 139 in the said piston. The rod 138 has longitudinal channels 141 over a certain length of the said rod from the mean position of the piston 133 onwards. The piston rod has a hole 142 which provides communication between the chamber 135 and the chamber 136 through the agency of the channels 141 when the piston is situated on the part of the rod 138 which is provided with channels. When the piston is situated on one or other end of the rod 138 there is substantially no longer any communication between the two chambers 135 and 136 since the passage is closed between the cylindrical surface of the rod 138 and the bore of the piston within which it slides, and only a jet 140 which extends through the piston 133 allows permanent communication between the two chambers 135 and 136.

The chamber 135 communicates with the interior of the hollow metal sphere 11 which constitutes the suspension device 4 by means of the damping device which is given the general reference numeral 144. The device 5 is again used here, this device establishing the reference pressure P2 and communicating on the one hand with the suspension device by way of the duct 16 provided with a pointed screw 18 and one the other hand with the chamber 135 by way of the duct 17 provided with a pointed screw 19.

The chamber 136 is in communication with a second suspension device 4a similar to the device 4 (but in this example constructed as an annular bag) by means of a constriction 146. The chamber 136 is also in communication with the interior of the damping device 144 by way of a duct 147.

In this example, the damping device 144 (see also FIGURE 8) is also constructed in the form of a device having stepped pistons similar to that shown in FIGURE 5, but comprising a supplementary piston and corresponding chamber.

In FIGURE 8 the same elements as those used in FIGURE 5 are given the same reference numerals. The piston 151 is added, which is movable in the annular chamber 152 whose effective volume it determines at each instant. For reasons of manufacture, this stepped piston group is constituted by a certain number of component parts rendered fast with one another.

The chamber 152 is connected to the chamber 136 of the suspension cylinder 134 by a duct 153 formed in the body 154 of the damping device, a duct 155 formed in the block 137, and the duct 147.

The operation of the suspension device shown in FIGURES 7 and 8 is as follows:

In the condition of rest, the pressure P1 which prevails in the chamber 135 of the suspension cylinder, the pressure P′2 of the chamber 136 of the same cylinder and the pressures P2, P3 and P″2 of the three elastic masses 5, 4 and 4a respectively are also equal to one another.

When the piston 133 is displaced slowly in the vicinity of its intermediate position of rest, the liquid contained in the chamber 135 can pass freely into the chamber 136 in such a manner that from the point of view of pressure variations everything happens as if the rod 150 of the piston were displaced alone within the cylinder 134. The two elastic masses 4 and 4a, therefore, operate in parallel and a suspension is obtained which has a certain flexibility.

On the contrary, if the movement of the piston 133 is carried out rapidly, the passage of the liquid from the chamber 135 into the chamber 136 is carried out with difficulty more especially from the movement at which the piston has passed the channels 141 of the rod 138 and is situated at one cylindrical end of the said rod, so that the two elastic masses 4 and 4a act in opposition, which produces a stiffening of the suspension.

The relations between the pressures and the dimensions of the parts of the damping device will now be given.

Let S be the effective surface of the piston 133 at its face opposite to the piston rod 150 and S' its annular surface bounded between the wall of the cylinder 134 and the rod 150.

In the condition of rest all the pressures are equal:

$$P_1 = P' = P_3 = P_2 \qquad (1)$$

The static force exerted in the condition of rest on the cylinder is:

$$F_o = P_2(S - S') \qquad (2)$$

When, from the condiiton of rest, a divergent movement is applied to the piston 133, for example when the wheel passes over a hump, the force exerted by the said piston on the cylinder becomes:

$$F = P_3 S - P'_2 S' \qquad (3)$$

since P1 and P3 are very close to one another.

Therefore, the convergent restoring force of the piston acting towards its position of rest from this position resulting from a divergent movement would be, if there were no damping, with $F > FO$ and $P1 = P3 > P2$ $$dF = F - FO = S(P3 - P2) - S'(P'2 - P2) \qquad (4)$$

If, owing to the damping action, in the convergent movement of the piston towards its position of rest, the difference $dF$ is reduced to $dF \times e$ wherein $e$ is a smaller co-efficient than unity ($e < 1$), the pressure P1 being less than P3, it is possible to say:

$$e \times dF = S(P1 - P2) - S'(P'2 - P2) \qquad (5)$$

By dividing (5) by (4) there is obtained:

$$e = \frac{S(P1 - P2) - S'(P'2 - P2)}{S(P3 - P2) - S'(P'2 - P2)}$$

hence $S(P1 - P2) = e \times S(P3 - P2) + (P'2 - P2)S'(1 - e)$ or $$SP1 = (S - S')(1 - e)P2 + eSP3 + S'(1 - e)P'2 \qquad (7)$$

This equation is valid whatever the values of P3 at each position of the returning movement to equilibrium, the magnitude of the throttling varying in each case with the inertia effects connected with the variations in the speed of contraction and resulting from the cross-section of the constriction of the central distributor 54.

If A1, A2, A'2 and A3 are the effective surfaces of the stepped pistons 111, 101, 151 and 102 respectively, we have:

$$A1 = A2 + A'2 + A3$$

To satisfy Equation 7, therefore, it is necessary for the three following conditions to be realised simultaneously:

$$A2 = \frac{S - S'}{S}(1 - e)A1$$

$$A'2 = \frac{S'}{S}(1 - e)A1$$

$$A3 = e \times A1 \qquad (8)$$

These conditions govern the relative dimensions to be given to the various elements of the device.

I claim:

1. A dampened hydraulic suspension apparatus comprising a mechanically deformable compartment connected by a liquid to an elastically deformable compartment through a damping device comprising three superposed chambers of variable volume, the first chamber being connected to the mechanically deformable compartment, the second chamber being connected to an intermediate reference pressure enclosure, and the third chamber being connected to the elastically deformable compartment, the first and third chambers being interconnected, under the control of differential pressures, by a first unidirectional circuit permitting flow of liquid from said first chamber to said third chamber, by a second unidirectional circuit permitting flow of liquid from said third chamber to said first chamber, and by a two-directional circuit of smaller section than that of said first and second unidirectional circuits.

2. A damped hydraulic suspension apparatus comprising a mechanically deformable compartment formed by two elements, one of which is connected to the chassis of a vehicle and the other to the corresponding wheel for the vertical movement thereof, an elastically deformable element and a damping device, said elastically deformable element being connected to the mechanically deformable compartment by means of a liquid agent which passes through said damping device, an enclosure in which prevails an intermediate reference pressure depending on the pressures which prevail during the stationary state in the mechanically deformable compartment and in the elastically deformable element respectively, said damping device comprising three chambers with mobile walls connected mechanically to one another by a mobile unit so that the volumes of said chambers can only vary simultaneously, the volumes of the second and third chambers varying in the opposite sense to variation of the volume of the first chamber, said first chamber being connected to the deformable compartment, the second chamber being connected to the said enclosure, and the third chamber being connected to the deformable elastic element, two relatively large-section unidirectional-flow circuits and a relatively narrow-section circuit having two directions of flow, the first and third chambers of the damping device being connected under the action of a divergent movement of the suspension, in accordance with the direction of movement, by one or other of said relatively large-section unidirectional circuits, one of which permits the passage of said liquid only from the first chamber to the third chamber and the other from the third to the first chamber, the outflow of liquid from the first chamber and the outflow of liquid from the third chamber being controlled by the mobile unit so that they are substantially closed in the stationary state of the rest position, and the first and third chambers of the damping device being connected under the effect of a convergent movement of the suspension by the said relatively narrow-section circuit which is also controlled by the mobile unit so that it is opened only when the said unit is only a small distance from its rest position.

3. Apparatus according to claim 2 wherein the second chamber is connected by way of a calibrated constriction to the intermediate reference pressure enclosure.

4. Apparatus according to claim 2 including a supplementary communication circuit between the first and third chambers with a low-inertia device adapted to permit the passage of the liquid in both directions from a predetermined value of the difference between the pressures which prevail on either side of this device, with a view to effecting the damping of the short period and steep-front oscillations.

5. Apparatus according to claim 2 including a supplementary communication circuit between the first and third chambers with a low-inertia device of the bilateral deflection seatless elastic disc type adapted to permit the passage of the liquid in both directions from a predetermined value of the difference between the pressures which prevail on either side of this device, with a view to effecting the damping of the short period and steep-front oscillations.

6. Apparatus according to claim 2 wherein the mobile walls of the variable-capacity chambers of the damping device are constituted by elastic deformable diaphragms having different effective surfaces, one edge of which is fixed to the casing of the apparatus whilst the other edge is fast with the said mobile unit.

7. Apparatus according to claim 2 wherein the mobile walls of the variable-capacity chambers of the damping device are constituted by elastic deformable diaphragms having different effective surfaces, the external edge of which is fixed to the casing of the apparatus whilst the internal edge is fast with the said mobile unit.

8. Apparatus according to claim 2 wherein the mobile walls of the variable-capacity chambers of the damping device are constituted by pistons connected to the mobile unit and mounted in cylinders fast with the casing of the device.

9. Apparatus according to claim 2 wherein the mobile walls of the variable-capacity chambers of the damping device are constituted by pistons connected to the mobile unit and mounted in cylinders fast with the casing of the device, the said pistons being coaxial and disposed in stepped manner.

10. Apparatus according to claim 2 including a suspension system having a second space which is mechanically deformable, in the opposite direction to the first, and connected to a second intermediate chamber adjoining the first intermediate chamber.

11. Apparatus according to claim 2 including a suspension system having a second space which is mechanically deformable, in the opposite direction to the first, and connected to a second intermediate chamber adjoining the first intermediate chamber, each intermediate chamber of the damping device being connected to the corresponding elastically deformable member by a duct comprising a calibrated constriction.

12. Apparatus according to claim 2 wherein the opening and closing of the various circuits is effected by ports of variable cross-section, the cross-sections thereof being varied by the displacements of elements in directions perpendicular to the direction of flow of the liquid through said ports.

References Cited in the file of this patent
FOREIGN PATENTS
803,381    Great Britain _____ Oct. 22, 1958